(12) United States Patent
Sakurada (10) Patent No.: US 11,987,341 B2
(45) Date of Patent: May 21, 2024

(54) SYSTEM FOR AND METHOD OF CONTROLLING WATERCRAFT

(71) Applicant: YAMAHA HATSUDOKI KABUSHIKI KAISHA, Iwata (JP)

(72) Inventor: Kento Sakurada, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 324 days.

(21) Appl. No.: 17/570,417

(22) Filed: Jan. 7, 2022

(65) Prior Publication Data

US 2022/0266974 A1 Aug. 25, 2022

(30) Foreign Application Priority Data

Feb. 25, 2021 (JP) .................. 2021-028609

(51) Int. Cl.
  *B63H 25/42* (2006.01)
  *B63B 79/10* (2020.01)
  *B63B 79/40* (2020.01)
  *B63H 25/06* (2006.01)

(52) U.S. Cl.
  CPC ............ *B63H 25/42* (2013.01); *B63B 79/10* (2020.01); *B63B 79/40* (2020.01); *B63H 25/06* (2013.01)

(58) Field of Classification Search
  CPC ........ B63H 25/42; B63H 25/06; B63H 25/04; B63H 2020/003; B63B 79/10; B63B 79/40
  See application file for complete search history.

(56) References Cited

U.S. PATENT DOCUMENTS

2007/0162207 A1 7/2007 Shimo et al.
2017/0139426 A1* 5/2017 Ito .................. B63H 25/42

FOREIGN PATENT DOCUMENTS

| CN | 108594807 B | * | 5/2019 | ........... G05D 1/0206 |
| CN | 107607093 B | * | 1/2020 | |
| JP | 4261330 B2 | | 4/2009 | |
| WO | WO-2016109832 A2 | * | 7/2016 | ............. B63B 49/00 |

OTHER PUBLICATIONS

Greytak, Matthew; High Performance Path Following for Marine Vehicles Using Azimuthing Podded Propulsion; Diss. MIT; 2006 (Year: 2006).*

* cited by examiner

*Primary Examiner* — Michael J Zanelli
(74) *Attorney, Agent, or Firm* — Keating & Bennett, LLP (57) ABSTRACT

A controller for a watercraft changes a rudder angle of a marine propulsion device by controlling a steering actuator based on a target yaw rate. The controller determines which of rightward turning and leftward turning is being made by the watercraft. The controller imposes a limitation on the leftward target yaw rate when the rightward turning is being made by the watercraft. The controller imposes a limitation on the rightward target yaw rate when the leftward turning is being made by the watercraft.

8 Claims, 13 Drawing Sheets

| TARGET POINT | VALUE OF LIMITATION ON TARGET YAW RATE (RIGHT) | VALUE OF LIMITATION ON TARGET YAW RATE (LEFT) |
|---|---|---|
| P1 | NO LIMITATION | NO LIMITATION |
| P2 | NO LIMITATION | 2 [deg/s] |
| P3 | NO LIMITATION | 1 [deg/s] |
| P4 | NO LIMITATION | 1 [deg/s] |
| P5 | 1 [deg/s] | NO LIMITATION |
| P6 | 1 [deg/s] | NO LIMITATION |
| ... | ... | ... |

FIG. 12

| TARGET POINT | VALUE OF LIMITATION ON TARGET YAW RATE (RIGHT) | VALUE OF LIMITATION ON TARGET YAW RATE (LEFT) |
| --- | --- | --- |
| P1 | 2 [deg/s] | NO LIMITATION |
| P2 | 2 [deg/s] | NO LIMITATION |
| P3 | 2 [deg/s] | NO LIMITATION |
| P4 | 2 [deg/s] | NO LIMITATION |
| P5 | 2 [deg/s] | NO LIMITATION |
| P6 | 2 [deg/s] | NO LIMITATION |
| ... | ... | ... |

FIG. 13

SYSTEM FOR AND METHOD OF CONTROLLING WATERCRAFT

CROSS REFERENCE TO RELATED APPLICATIONS

This application claims the benefit of priority to Japanese Patent Application No. 2021-028609 filed on Feb. 25, 2021. The entire contents of this application are hereby incorporated herein by reference.

BACKGROUND OF THE INVENTION

1. Field of the Invention

The present invention relates to a system for and a method of controlling a watercraft.

2. Description of the Related Art

There has been conventionally known a type of system for controlling a marine propulsion device to move a watercraft along a target course or trajectory set for the watercraft. For example, Japan Patent No. 4261330 describes an automated steering device in which a controller sets a spiral target course having a predetermined turning radius. The controller automatically steers the watercraft such that a difference between a direction oriented along the target course (target direction) and a direction oriented by the ship at present (present direction) is caused to become "0".

In an attempt to turn the watercraft along the target course, the watercraft may greatly deviate from the target course. In this case, the controller steers the watercraft in the opposite direction to the turning direction. For example, when the watercraft crosses the target course rightward during right turning, the controller turns the watercraft leftward such that the difference between the target direction and the present direction of the watercraft is caused to become "0".

Undesirably, however, chances are that the watercraft greatly deviates from the target course in a leftward direction. In this case, the controller turns the watercraft rightward such that the difference between the directions is caused to become "0". When such watercraft behaviors are repeated by the features of the watercraft or due to influences of disturbances (wind, tide, etc.), the watercraft undesirably meanders, such that the comfort of an operator of the watercraft is deteriorated.

SUMMARY OF THE INVENTION

Preferred embodiments of the present invention accurately move a watercraft along a target course.

A system according to a first preferred embodiment of the present invention controls a watercraft. The system includes a marine propulsion device, a steering actuator, a position sensor, a direction sensor, and a controller. The marine propulsion device is rotatable about a steering shaft. The steering actuator rotates the marine propulsion device about the steering shaft. The position sensor detects a present position of the watercraft. The direction sensor detects a present direction of the watercraft. The controller is configured or programmed to control the marine propulsion device and the steering actuator such that the watercraft moves along a predetermined target course.

The controller determines a target direction of the watercraft based on the target course. The controller calculates a directional difference between the target direction and the present direction. The controller determines a target yaw rate based on the directional difference with reference to target yaw rate data. The target yaw rate data defines a relationship between the directional difference and the target yaw rate. The controller changes a rudder angle of the marine propulsion device by controlling the steering actuator based on the target yaw rate. The controller determines which of rightward turning and leftward turning is being made by the watercraft. The controller imposes a limitation on the target yaw rate when the target yaw rate is a leftward yaw rate and rightward turning is being made by the watercraft. The controller imposes a limitation on the target yaw rate when the target yaw rate is a rightward yaw rate and leftward turning is being made by the watercraft.

A method according to a second preferred embodiment of the present invention controls a watercraft including a marine propulsion device. The method includes determining a target course of the watercraft, detecting a present position of the watercraft, detecting a present direction of the watercraft, determining a target direction of the watercraft based on the target course, calculating a directional difference between the target direction and the present direction, determining a target yaw rate based on the directional difference with reference to target yaw rate data defining a relationship between the directional difference and the target yaw rate, changing a rudder angle of the marine propulsion device based on the target yaw rate, determining which of rightward turning and leftward turning is being made by the watercraft, imposing a limitation on the leftward target yaw rate when the rightward turning is being made by the watercraft, and imposing a limitation on the rightward target yaw rate when the leftward turning is being made by the watercraft.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
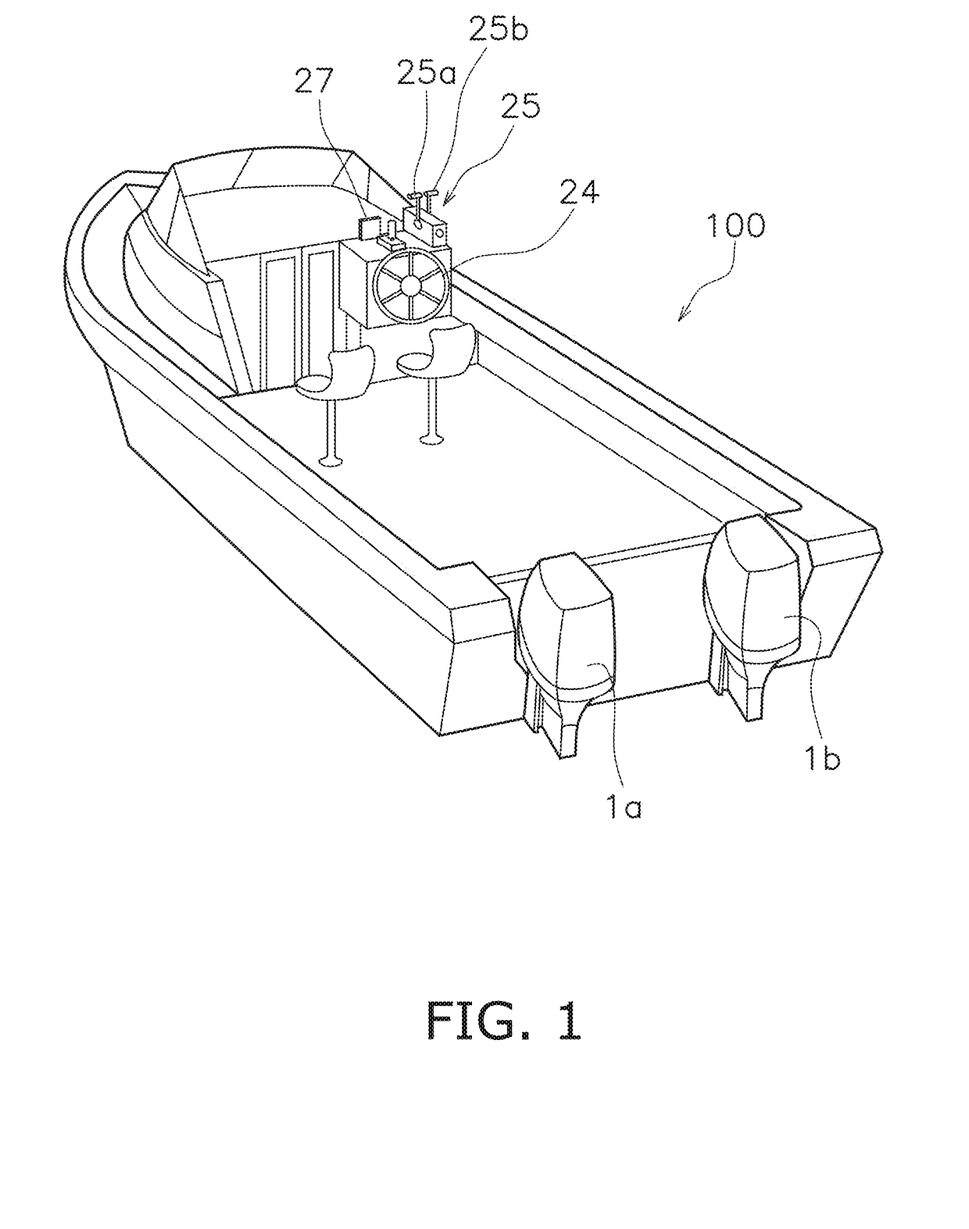
FIG. 1 is a perspective view of a watercraft in which a system according to a preferred embodiment of the present invention is installed.

Preferred embodiments of the present invention will be hereinafter explained with reference to drawings. FIG. 1 is a perspective view of a watercraft 100 in which a system according to a preferred embodiment of the present invention is installed. The system controls the watercraft 100 and includes a first marine propulsion device 1a and a second marine propulsion device 1b. It should be noted that the number of marine propulsion devices is not limited to two. The number of marine propulsion devices may be one. Alternatively, the number of marine propulsion devices may be more than two.

The first and second marine propulsion devices 1a and 1b are attached to the stern of the watercraft 100. The first and second marine propulsion devices 1a and 1b are outboard motors. The first and second marine propulsion devices 1a and 1b are aligned in a width direction of the watercraft 100. Specifically, the first marine propulsion device 1a is located on the port side of the watercraft 100. The second marine propulsion device 1b is located on the starboard side of the watercraft 100. Each marine propulsion device 1a, 1b generates a thrust to propel the watercraft 100.

Figure 2:
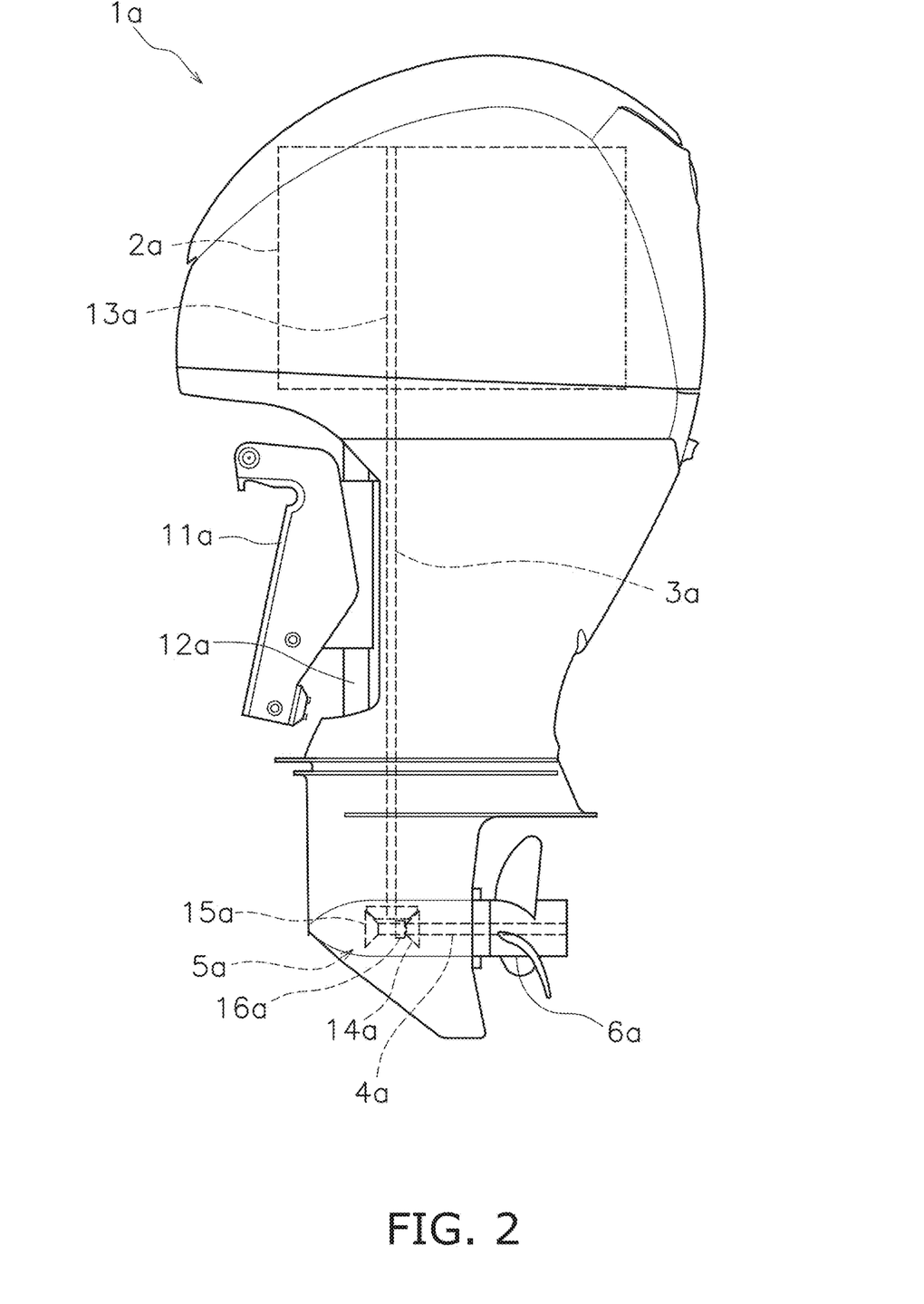
FIG. 2 is a side view of one of marine propulsion devices.

FIG. 2 is a side view of the first marine propulsion device 1a. The structure of the first marine propulsion device 1a will be hereinafter explained. However, the structure of the first marine propulsion device 1a is also true of the second marine propulsion device 1b. The first marine propulsion device 1a is attached to the watercraft 100 through a bracket 11a. The bracket 11a supports the first marine propulsion device 1a such that the first marine propulsion device 1a is rotatable about a first steering shaft 12a. The first steering shaft 12a extends in an up-and-down direction of the first marine propulsion device 1a.

The first marine propulsion device 1a includes a first engine 2a, a first drive shaft 3a, a first propeller shaft 4a, and a first shift mechanism 5a. The first engine 2a generates the thrust to propel the watercraft 100. The first engine 2a is an internal combustion engine, for example. The first engine 2a includes a crankshaft 13a. The crankshaft 13a extends in the up-and-down direction of the first marine propulsion device 1a. The first drive shaft 3a is connected to the crankshaft 13a. The first drive shaft 3a extends in the up-and-down direction of the first marine propulsion device 1a. The first propeller shaft 4a extends in a back-and-forth direction of the first marine propulsion device 1a. The first propeller shaft 4a is connected to the first drive shaft 3a through the first shift mechanism 5a. A propeller 6a is attached to the first propeller shaft 4a.

The first shift mechanism 5a includes a forward moving gear 14a, a rearward moving gear 15a, and a dog clutch 16a. When gear engagement of each gear 14a, 15a is switched by the dog clutch 16, the direction of rotation transmitted from the first drive shaft 3a to the propeller shaft 4a is switched. Movement of the watercraft 100 is thus switched between forward movement and rearward movement.

More specifically, the first shift mechanism 5a is switchable among a forward moving state, a rearward moving state, and a neutral state. When the first shift mechanism 5a is set in the forward moving state, the dog clutch 16a is connected to the forward moving gear 14a. Accordingly, the rotation of the first drive shaft 3a is transmitted to the first propeller shaft 4a so as to rotate the first propeller shaft 4a in a rotational direction corresponding to a forward moving direction. When the first shift mechanism 5a is set in the rearward moving state, the dog clutch 16a is connected to the rearward moving gear 15a. Accordingly, the rotation of the first drive shaft 3a is transmitted to the first propeller shaft 4a so as to rotate the first propeller shaft 4a in a rotational direction corresponding to a rearward moving direction. When the first shift mechanism 5a is set in the neutral state, the dog clutch 16a is released from being connected to each of the forward moving gear 14a and the rearward moving gear 15a. Accordingly, the rotation of the first drive shaft 3a is not transmitted to the first propeller shaft 4a.

Figure 3:
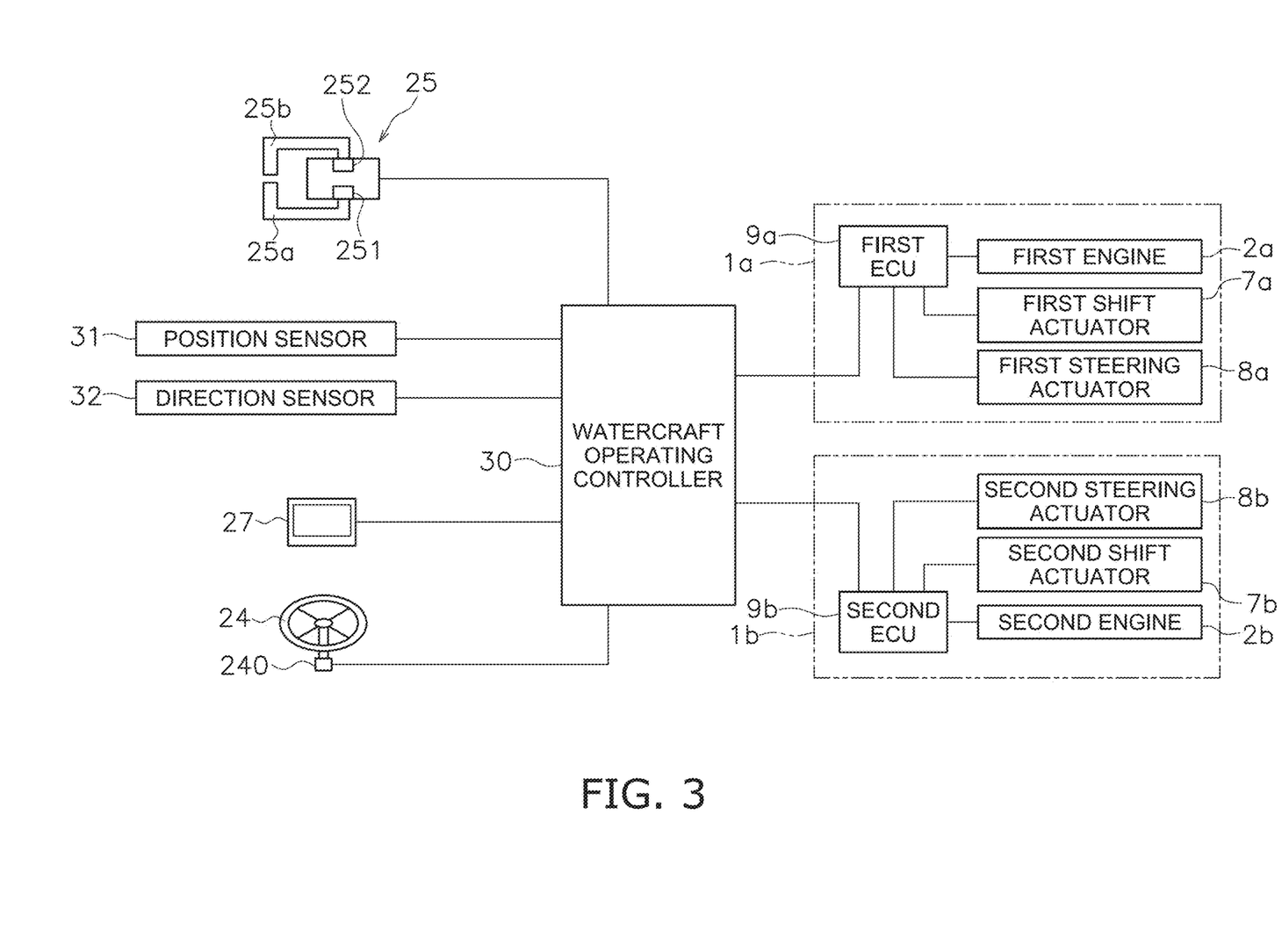
FIG. 3 is a schematic diagram showing a configuration of the system.

FIG. 3 is a schematic diagram of the system to control the watercraft 100. As shown in FIG. 3, the first marine propulsion device 1a includes a first shift actuator 7a and a first steering actuator 8a. The first shift actuator 7a is connected to the dog clutch 16a of the first shift mechanism 5a. The first shift actuator 7a actuates the dog clutch 16a to switch gear engagement of each gear 14a, 15a. Movement of the watercraft 100 is thus switched between forward movement and rearward movement. The first shift actuator 7a is, for instance, an electric motor. However, the first shift actuator 7a may be another type of actuator such as an electric cylinder, a hydraulic motor, or a hydraulic cylinder.

The first steering actuator 8a is connected to the first marine propulsion device 1a. The first steering actuator 8a rotates the first marine propulsion device 1a about the first steering shaft 12a. Accordingly, the rudder angle of the first marine propulsion device 1a is changed. The rudder angle refers to an angle of the first propeller shaft 4a with respect to the back-and-forth direction of the first marine propulsion device 1a. The first steering actuator 8a is, for instance, an electric motor. However, the first steering actuator 8a may be another type of actuator such as an electric cylinder, a hydraulic motor, or a hydraulic cylinder.

The first marine propulsion device 1a includes a first ECU (Electric Control Unit) 9a. The first ECU 9a includes a processor such as a CPU (Central Processing Unit) and memories such as a RAM (Random Access Memory) and a ROM (Read Only Memory). The first ECU 9a stores a program and data to control the first marine propulsion device 1a. The first ECU 9a controls the first engine 2a.

The second marine propulsion device 1b includes a second engine 2b, a second shift actuator 7b, a second steering actuator 8b, and a second ECU 9b. The second marine propulsion device 1b is rotatable about a second steering shaft. The second engine 2b, the second shift actuator 7b, the second steering actuator 8b, and the second ECU 9b in the second marine propulsion device 1b are configured in a similar manner to the first engine 2a, the first shift actuator 7a, the first steering actuator 8a, and the first ECU 9a in the first marine propulsion device 1a, respectively.

The system includes a steering wheel 24, a remote controller 25, and an input device 27. As shown in FIG. 1, the steering wheel 24, the remote controller 25, and the input device 27 are located in a cockpit of the watercraft 100.

The steering wheel 24 allows an operator to operate a turning direction of the watercraft 100. The steering wheel 24 includes a sensor 240. The sensor 240 outputs a steering signal indicating an operating direction and an operating amount of the steering wheel 24.

The remote controller 25 includes a first throttle lever 25a and a second throttle lever 25b. The first throttle lever 25a allows the operator to regulate the magnitude of the thrust generated by the first marine propulsion device 1a. The first throttle lever 25a also allows the operator to switch the direction of the thrust generated by the first marine propulsion device 1a between the forward moving direction and the rearward moving direction. The first throttle lever 25a is operable from a neutral position to a forward moving directional side and a rearward moving directional side. The neutral position is a position located between the forward moving directional side and the rearward moving directional side. The first throttle lever 25a includes a sensor 251. The sensor 251 outputs a first throttle signal indicating an operating direction and an operating amount of the first throttle lever 25a.

The second throttle lever 25b allows the operator to regulate the magnitude of the thrust generated by the second marine propulsion device 1b. The second throttle lever 25b also allows the operator to switch the direction of the thrust generated by the second marine propulsion device 1b between the forward moving direction and the rearward moving direction. The second throttle lever 25b is configured in a similar manner to the first throttle lever 25a. The second throttle lever 25b includes a sensor 252. The sensor 252 outputs a second throttle signal indicating an operating direction and an operating amount of the second throttle lever 25b.

The input device 27 is operable to set one of a plurality of operating modes. The input device 27 is, for instance, a touchscreen or at least one switch. The input device 27 outputs a setting signal indicating the setting of the operating mode inputted into the input device 27.

The system includes a position sensor 31. The position sensor 31 detects a position of the watercraft 100 located at the present time. The position sensor 35 is a GNSS (Global Navigation Satellite System) receiver such as a GPS (Global Positioning System) receiver. However, the position sensor 31 may be a type of sensor other than the GNSS receiver. The position sensor 31 outputs a position signal indicating the present position of the watercraft 100.

The system includes a direction sensor 32. The direction sensor 32 detects a direction oriented by the watercraft 100 at the present time, for example, a compass direction of the watercraft. The direction sensor 32 may include, for instance, an IMU (Inertial Measurement Unit) and a GPS. However, the direction sensor 32 may be a type of sensor other than the IMU and a GPS. The direction sensor 32 outputs a direction signal indicating the present direction of the watercraft 100.

The system includes a watercraft operating controller 30. The watercraft operating controller 30 includes a processor such as a CPU and memories such as a RAM and a ROM. The watercraft operating controller 30 stores programs and data to control the first and second marine propulsion devices 1a and 1b.

The watercraft operating controller 30 is connected to the first and second ECUs 9a and 9b through wired or wireless communication. The watercraft operating controller 30 is connected to the steering wheel 24, the remote controller 25, and the input device 27.

The watercraft operating controller 30 receives the steering signal from the sensor 240. The watercraft operating controller 30 receives the throttle signal from each sensor 251, 252. The watercraft operating controller 30 receives the setting signal from the input device 27. The watercraft operating controller 30 outputs command signals to the first and second ECUs 9a and 9b based on the signals received from the sensors 240, 251, 252 and the input device 27.

Command signals are transmitted to the first engine 2a, the first shift actuator 7a, and the first steering actuator 8a through the first ECU 9a. Command signals are transmitted to the second engine 2b, the second shift actuator 7b, and the second steering actuator 8b through the second ECU 9b.

The watercraft operating controller 30 outputs a first shift command for the first shift actuator 7a in accordance with the operating direction of the first throttle lever 25a. In response, shifting between forward movement and rearward movement by the first marine propulsion device 1a is performed. The watercraft operating controller 30 outputs a first throttle command for the first engine 2a in accordance with the operating amount of the first throttle lever 25a. The first ECU 9a controls the thrust of the first marine propulsion device 1a in accordance with the first throttle command. It should be noted that the first throttle signal outputted from the sensor 251 may be directly inputted to the first ECU 9a. The first ECU 9a may output the first throttle command to the first engine 2a in accordance with the first throttle signal received from the sensor 251.

The watercraft operating controller 30 outputs a second shift command for the second shift actuator 7b in accordance with the operating direction of the second throttle lever 25b. In response, shifting between forward movement and rearward movement by the second marine propulsion device 1b is performed. The watercraft operating controller 30 outputs a second throttle command for the second engine 2b in accordance with the operating amount of the second throttle lever 25b. The second ECU 9b controls the thrust of the second marine propulsion device 1b in accordance with the second throttle command. It should be noted that the second throttle signal outputted from the sensor 252 may be directly inputted to the second ECU 9b. The second ECU 9b may output the second throttle command to the second engine 2b in accordance with the second throttle signal received from the sensor 252.

The watercraft operating controller 30 outputs a command signal for each of the first and second steering actuators 8a and 8b in accordance with the operating direction and the operating amount of the steering wheel 24. When the steering wheel 24 is operated leftward from the neutral position, the watercraft operating controller 30 controls the first and second steering actuators 8a and 8b such that the first and second marine propulsion devices 1a and 1b are rotated rightward. The watercraft 100 thus turns leftward.

When the steering wheel 24 is operated rightward from the neutral position, the watercraft operating controller 30 controls the first and second steering actuators 8a and 8b such that the first and second marine propulsion devices 1a and 1b are rotated leftward. The watercraft 100 thus turns rightward. Additionally, the watercraft operating controller 30 controls the rudder angle of the first marine propulsion device 1a and that of the second marine propulsion device 1b depending on the operating amount of the steering wheel 24.

The watercraft operating controller 30 is connected to the position sensor 31 in a communicable manner. The watercraft operating controller 30 obtains the position of the watercraft 100 based on the position signal received from the position sensor 31. Additionally, the watercraft operating controller 30 obtains a velocity of the watercraft 100 based on the position signal received from the position sensor 31. The system may include another type of sensor to detect the velocity of the watercraft 100. The watercraft operating controller 30 is connected to the direction sensor 32 in a communicable manner. The watercraft operating controller 30 obtains the present direction of the watercraft 100 based on the direction signal received from the direction sensor 32.

The watercraft operating controller 30 automatically controls the watercraft 100 in a predetermined one of the operating modes based on the setting signal received from the input device 27. In the predetermined operating mode, the watercraft operating controller 30 controls each marine propulsion devices 1a, 1b and each steering actuator 8a, 8b to move the watercraft 100 along a predetermined target course or trajectory.

Figure 4:
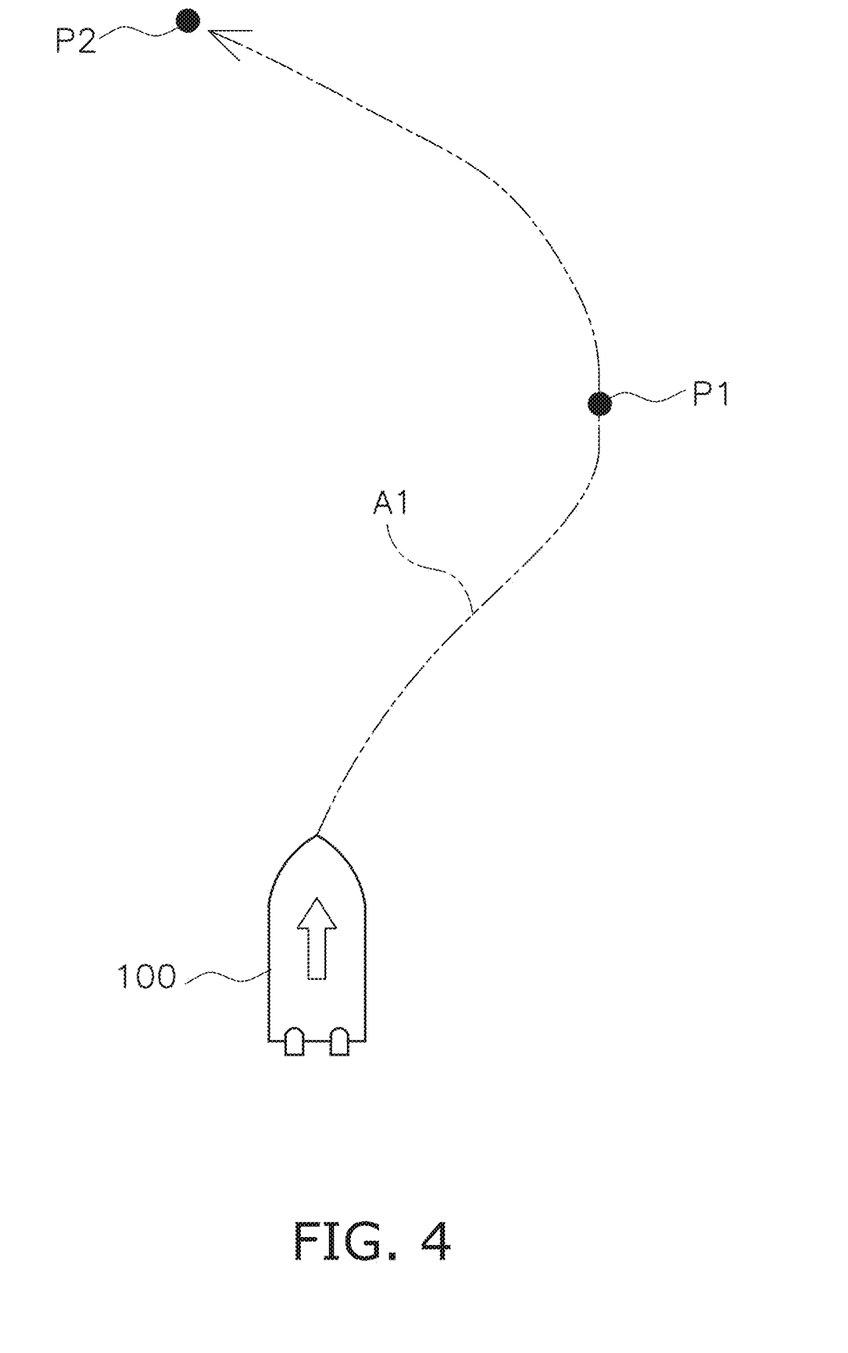
FIG. 4 is a diagram showing a course of the watercraft in a track point mode.

The operating modes include a track point mode. As shown in FIG. 4, in the track point mode, the watercraft operating controller 30 controls each marine propulsion device 1a, 1b such that the watercraft 100 moves along a target course A1 on which predetermined points (spots) P1 and P2 are located. For example, the operator selects the predetermined points P1 and P2 with the input device 27. The watercraft operating controller 30 computes the target course A1, on which the predetermined points P1 and P2 are located, and controls each marine propulsion device 1a, 1b such that the watercraft 100 moves along the target course A1.

Figure 5:
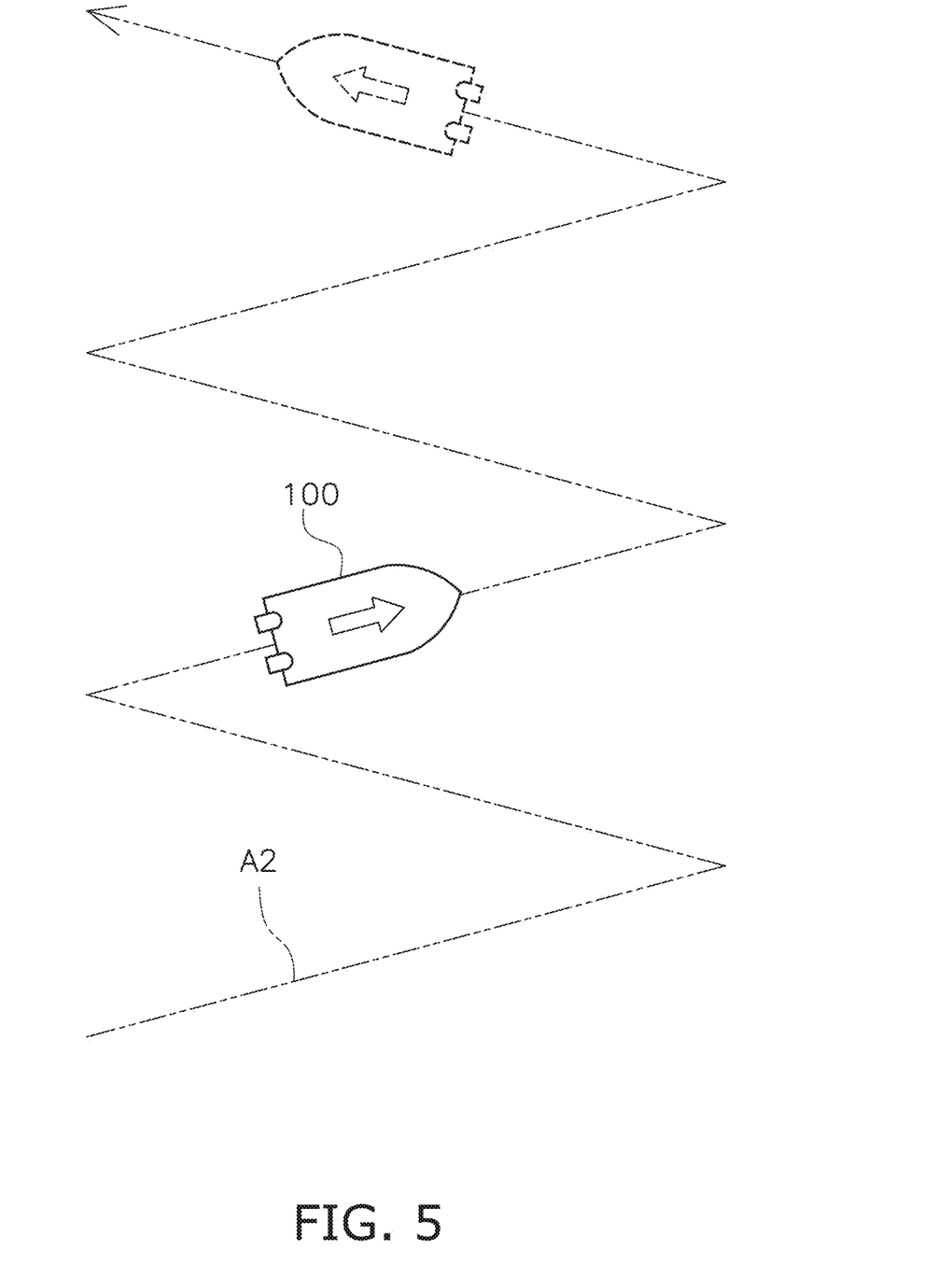
FIG. 5 is a diagram showing a course of the watercraft in a zigzag pattern turning mode.
Figure 6:
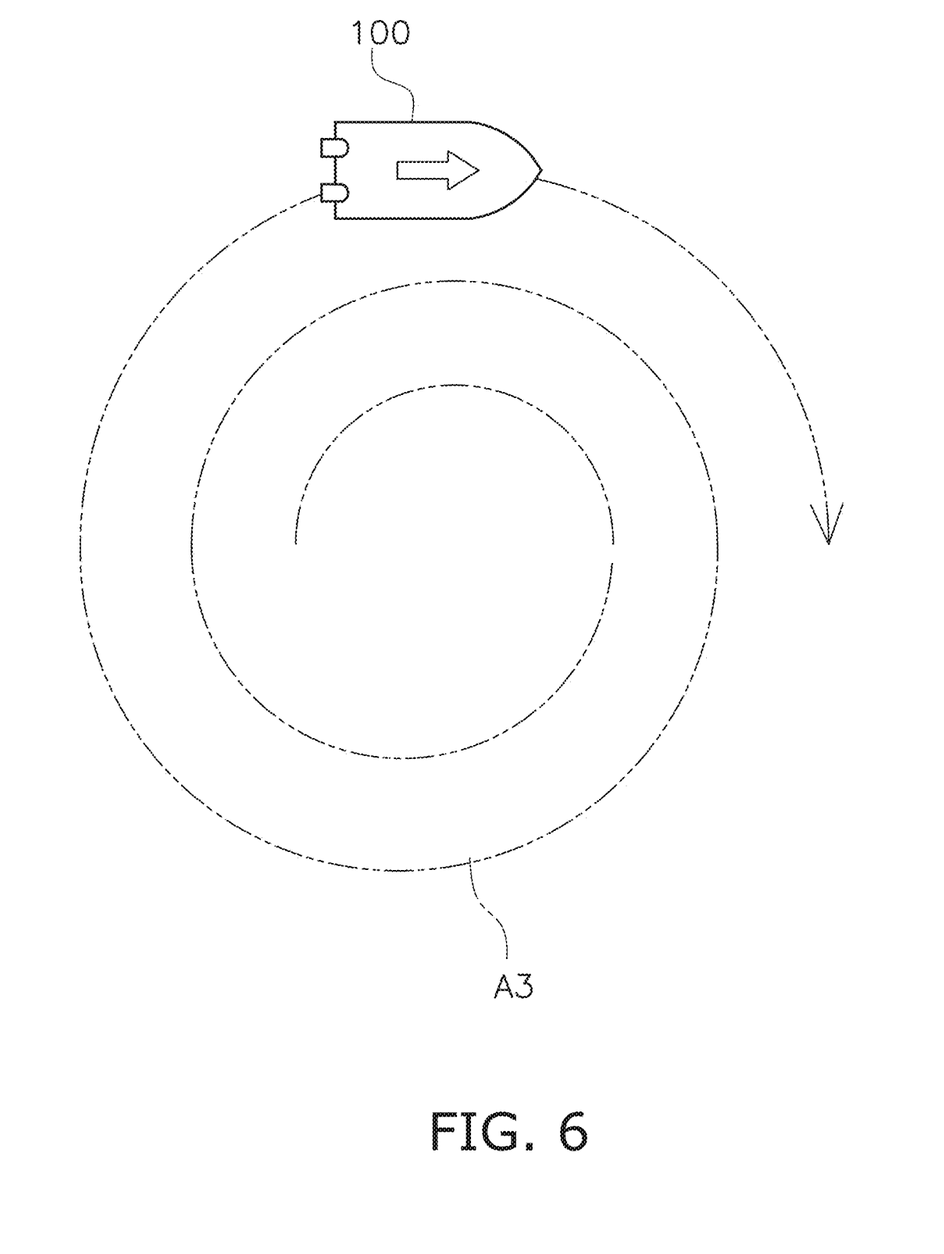
FIG. 6 is a diagram showing a course of the watercraft in a spiral pattern turning mode.

The operating modes include a pattern turning mode. In the pattern turning mode, the watercraft operating controller 30 controls each marine propulsion device 1a, 1b such that the watercraft 100 moves along a predetermined one of various turning patterns. The turning patterns include a zigzag turning pattern shown by a target course A2 in FIG. 5 and a spiral turning pattern shown by a target course A3 in FIG. 6. The operator selects one of the turning patterns with the input device 27.

Figure 7:
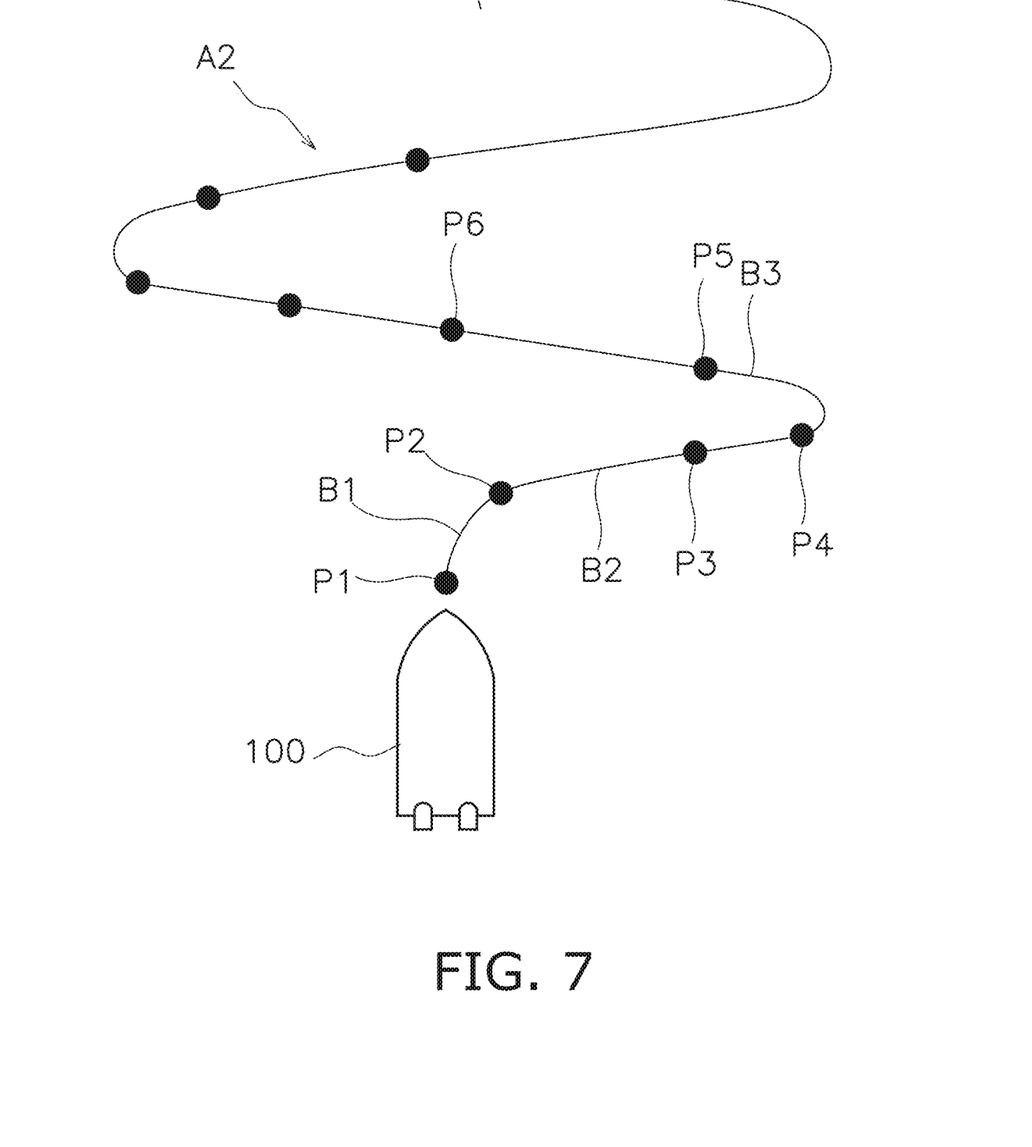
FIG. 7 is a diagram showing target points in the zigzag pattern turning mode.

When the zigzag shape is selected as the turning pattern, the watercraft operating controller 30 controls each marine propulsion device 1a, 1b such that the watercraft 100 moves zigzag in the pattern turning mode. For example, the operator inputs the interval and the angle of the zigzag shape with the input device 27. As shown in FIG. 7, the watercraft operating controller 30 determines target points P1 to P6 located on the zigzag target course A2 based on the interval and the angle of the zigzag shape. The watercraft operating controller 30 controls each marine propulsion device 1a, 1b such that the watercraft 100 passes through the target points P1 to P6.

Figure 8:
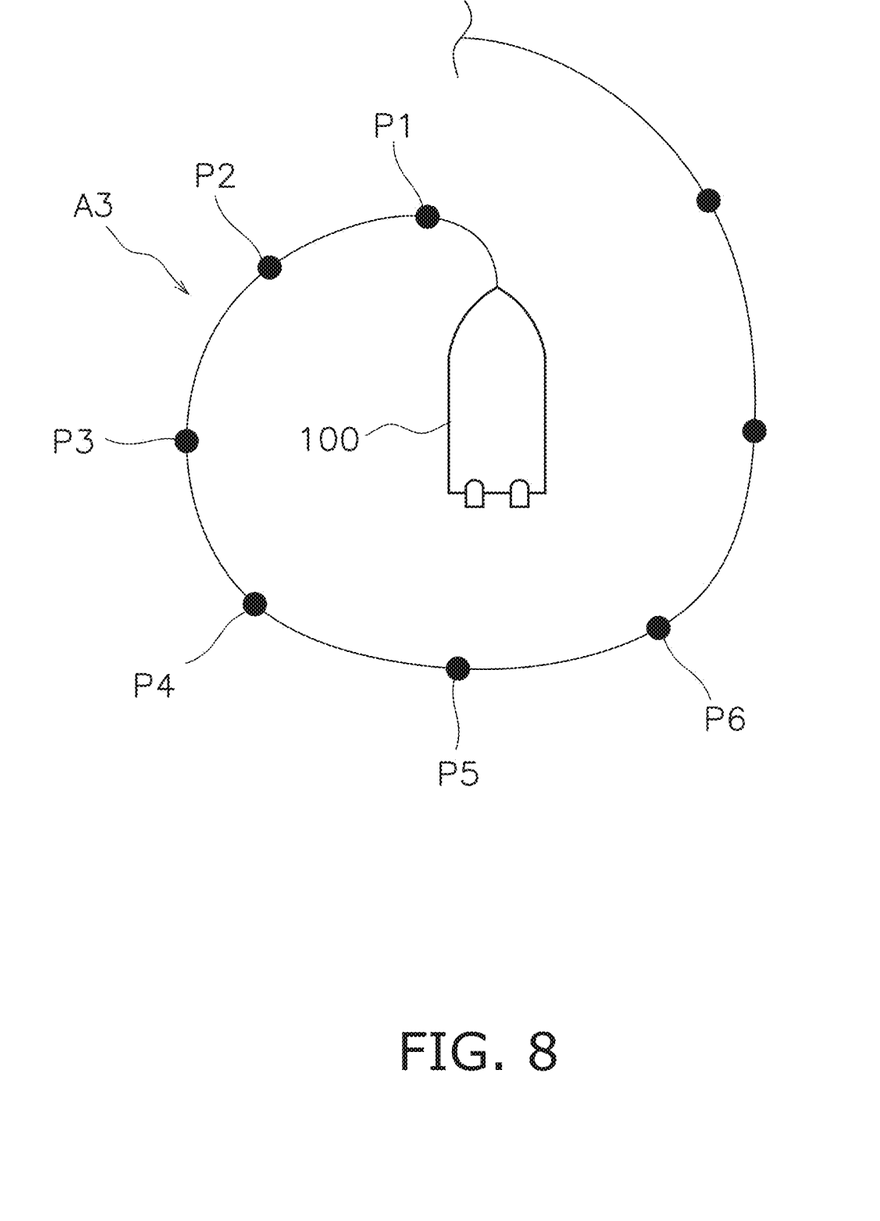
FIG. 8 is a diagram showing target points in the spiral pattern turning mode.

When the spiral shape is selected as the turning pattern, the watercraft operating controller 30 controls each marine propulsion device 1a, 1b such that the watercraft 100 spirally moves in the pattern turning mode. For example, the operator inputs the radius of turning with the input device 27. As shown in FIG. 8, the watercraft operating controller 30 determines target points P1 to P6 located on the spiral target course A3 based on the radius of turning. The watercraft operating controller 30 controls each marine propulsion device 1a, 1b such that the watercraft 100 passes through the target points P1 to P6.

Figure 9:
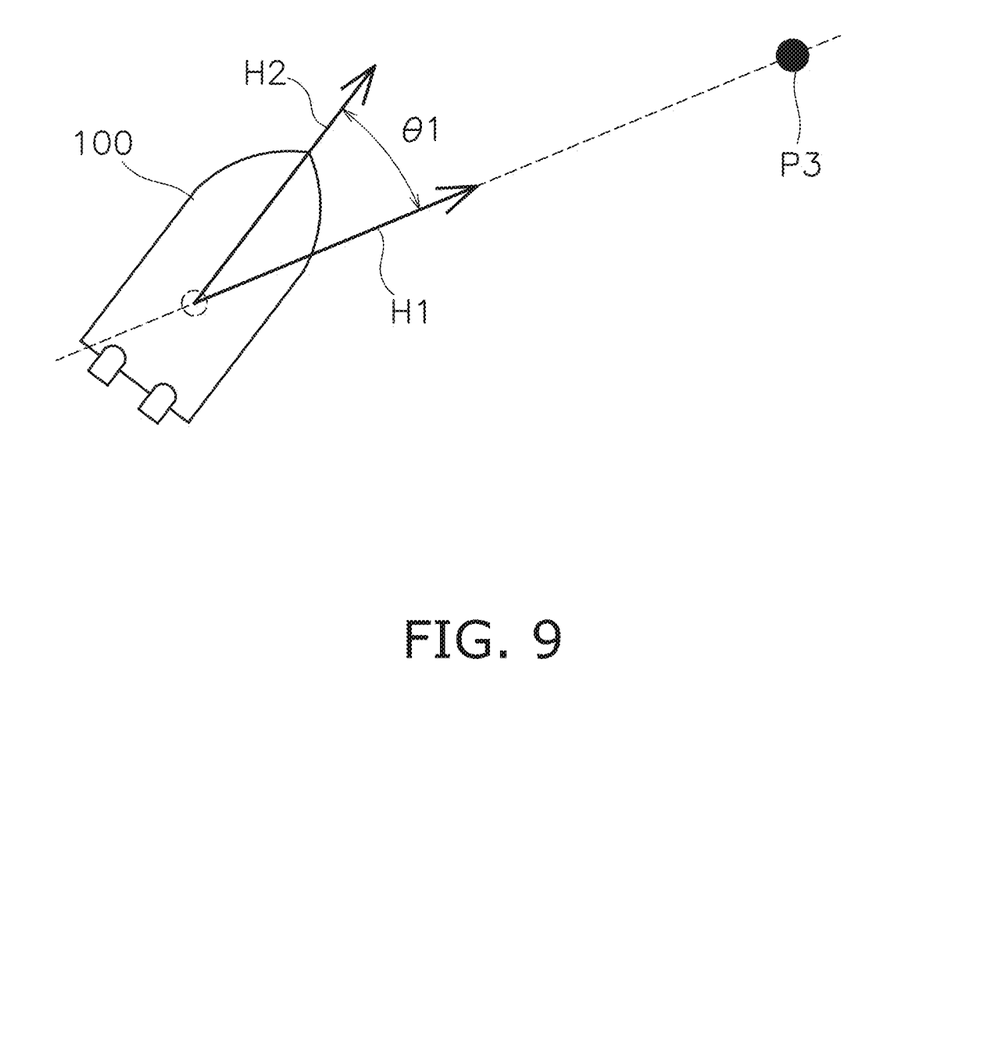
FIG. 9 is a diagram exemplifying a difference between a target direction and a present direction.

During each of the operating modes described above, the watercraft operating controller 30 determines the target direction of the watercraft 100 based on the target course. For example, as shown in FIG. 9, the watercraft operating controller 30 determines a target direction H1 oriented toward the next target point P3. The watercraft operating controller 30 calculates a directional difference el that indicates a difference between the target direction H1 and a direction H2 oriented by the watercraft 100 at the present time. With reference to target yaw rate data, the watercraft operating controller 30 determines a target yaw rate based on the directional difference el. The target yaw rate data defines a relationship between the directional difference el and the target yaw rate. The yaw rate indicates changes in the yaw angle of the watercraft 100 per unit time during turning of the watercraft 100.

Figure 10:
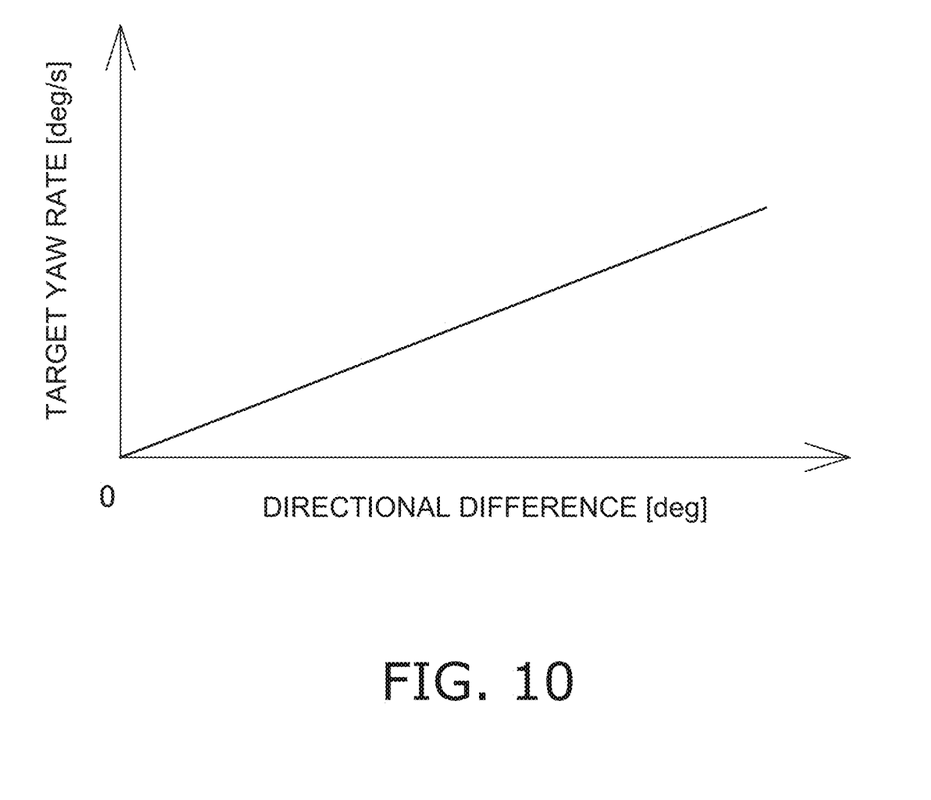
FIG. 10 is a chart exemplifying target yaw rate data.

FIG. 10 is a chart exemplifying the target yaw rate data. As shown in FIG. 10, the target yaw rate data defines that a target yaw rate increases with an increase in the directional difference el. It should be noted that the target yaw rate data is not limited to that represented by the shape shown in FIG. 10, and alternatively, may be represented by another shape.

The watercraft operating controller 30 changes the rudder angle of each marine propulsion device 1a, 1b by controlling each steering actuator 8a, 8b based on the target yaw rate. When the present direction H2 is displaced rightward from the target direction H1, the watercraft operating controller 30 determines the target yaw rate as a leftward yaw rate. Accordingly, the watercraft 100 turns leftward to reduce the directional difference θ1. When the present direction H2 is displaced leftward from the target direction H1, the watercraft operating controller 30 determines the target yaw rate as a rightward yaw rate. Accordingly, the watercraft 100 turns rightward to reduce the directional difference θ1.

Figure 11:
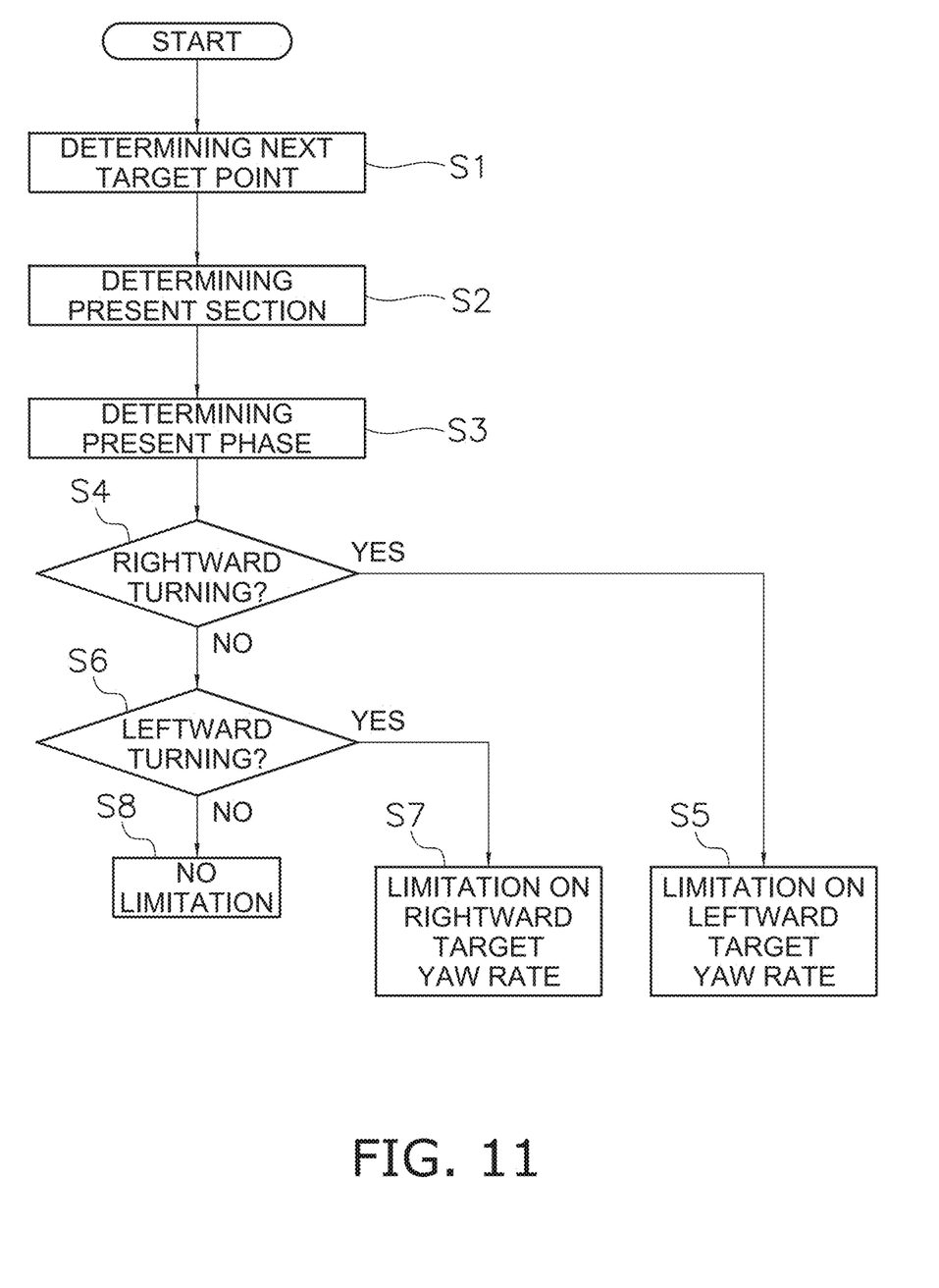
FIG. 11 is a flowchart showing a series of processes performed during yaw rate limiting control.

The watercraft operating controller 30 executes yaw rate limiting control to impose a limitation on the target yaw rate in the pattern turning mode. FIG. 11 is a flowchart showing a series of processes performed during the yaw rate limiting control in the pattern turning mode. As shown in FIG. 11, the watercraft operating controller 30 determines a next target point in step S1.

In step S2, the watercraft operating controller 30 determines a present section. For example, as shown in FIG. 7, when the next target point is the target point S2, the watercraft operating controller 30 determines a section B1 between the target points P1 and P2 as the present section. When the next target point is the target point P3, the watercraft operating controller 30 determines a section B2 between the target points P2 and P3 as the present section.

In step S3, the watercraft operating controller 30 determines a present phase. The present phase indicates which of rightward turning and leftward turning is being made by the watercraft 100. The watercraft operating controller 30 determines the present phase based on the next target point and the present position of the watercraft 100.

In step S4, the watercraft operating controller 30 determines whether or not the present phase is the rightward turning. When the present phase is the rightward turning, the watercraft operating controller 30 imposes a limitation on the target yaw rate determined as a leftward yaw rate (leftward target yaw rate) in step S5. In step S6, the watercraft operating controller 30 determines whether or not the present phase is the leftward turning. When the present phase is the leftward turning, the watercraft operating controller 30 imposes a limitation on the target yaw rate determined as a rightward yaw rate (rightward target yaw rate) in step S7. When the present phase is neither the rightward turning nor the leftward turning, the watercraft operating controller 30 does not impose a limitation on the target yaw rate in step S8.

Figure 12:
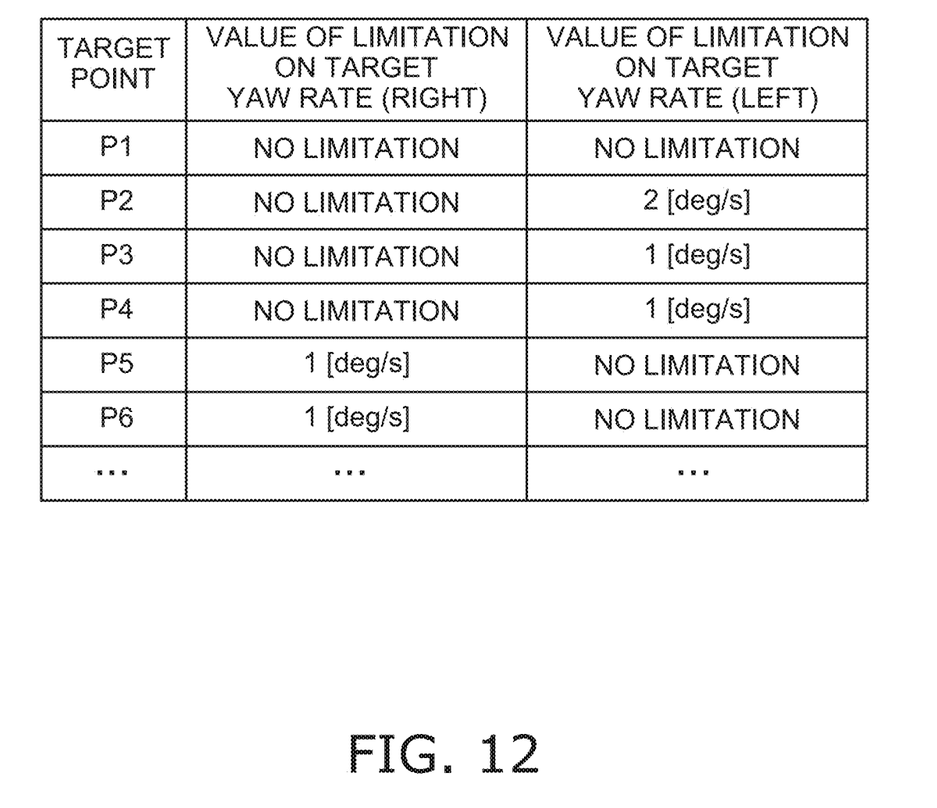
FIG. 12 is a chart showing values of limitations imposed on a target yaw rate in the zigzag pattern turning mode.

For example, FIG. 12 shows values of limitations imposed on the target yaw rate in the zigzag pattern turning mode. The watercraft operating controller 30 determines the target yaw rate such that the target yaw rate does not exceed the value of the limit. When the next target point is the target point P1 shown in FIG. 7, the watercraft operating controller 30 determines that the present phase is neither the rightward turning nor the leftward turning. Therefore, as shown in FIG. 12, when the next target point is the target point P1, the watercraft operating controller 30 does not impose a limitation on both the rightward target yaw rate and the leftward target yaw rate.

When the next target point is the target point P2 shown in FIG. 7, the watercraft operating controller 30 determines that the present phase is the rightward turning. When the rightward turning is being made by the watercraft 100 as seen in the movement toward the target point P2, the watercraft operating controller 30 determines that the present phase is the rightward turning. Therefore, as shown in FIG. 12, when the next target point is the target point P2, the watercraft operating controller 30 imposes a limitation on the leftward target yaw rate without imposing a limitation on the rightward target yaw rate.

When the next target point is the target point P3 shown in FIG. 7, the watercraft operating controller 30 determines that the present phase is the rightward turning. When the section, followed by the watercraft 100 at present, is a post-rightward turning section (B2) having a straight shape as seen in movement toward the target point P3, the watercraft operating controller 30 determines that the present phase is the rightward turning. Therefore, as shown in FIG. 12, when the next target point is the target point P3, the watercraft operating controller 30 imposes a limitation on the leftward target yaw rate without imposing a limitation on the rightward target yaw rate. When the next target point is the target point P4 shown in FIG. 7, the watercraft operating controller 30 imposes a limitation on the leftward target yaw rate without imposing a limitation on the rightward target yaw rate in a similar manner to when the next target point is the target point P3.

When the next target point is the target point P5 shown in FIG. 7, the watercraft operating controller 30 determines that the present phase is the leftward turning. When the section, followed by the watercraft 100 at present, is a post-leftward turning section (B3) having a straight shape as seen in the movement toward the target point P5, the watercraft operating controller 30 determines that the present phase is the leftward turning. Therefore, as shown in FIG. 12, when the next target point is the target point P5, the watercraft operating controller 30 imposes a limitation on the rightward target yaw rate without imposing a limitation on the leftward target yaw rate.

When the next target point is the target point P6 shown in FIG. 7, the watercraft operating controller 30 imposes a limitation on the rightward target yaw rate without imposing a limitation on the leftward target yaw rate in a similar manner to when the next target point is the target point P5. When the next target point is any of the target point P6 and thereafter, the watercraft operating controller 30 determines how to impose a limitation on the target yaw rate depending on the present phase in a similar manner to the above, although the illustration thereof is herein omitted.

Figure 13:
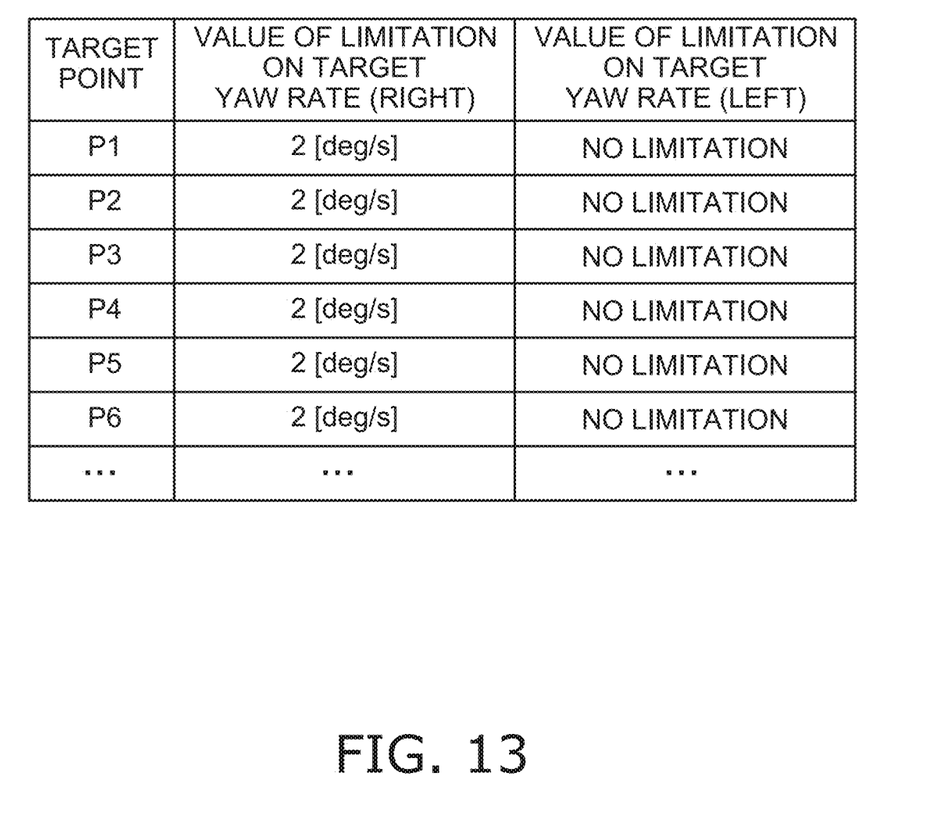
FIG. 13 is a chart showing values of limitations imposed on the target yaw rate in the spiral pattern turning mode.

FIG. 13 shows values of limitations imposed on the target yaw rate in the spiral pattern turning mode. When the next target point is the target point P1 shown in FIG. 8, the watercraft operating controller 30 determines that the present phase is the leftward turning. When the leftward turning is being made by the watercraft 100 as seen in the movement toward the target point P1, the watercraft operating controller 30 determines that the present phase is the leftward turning. Therefore, as shown in FIG. 13, when the next target point is the target point P1, the watercraft operating controller 30 imposes a limitation on the rightward target yaw rate without imposing a limitation on the leftward target yaw rate.

When the next target point is any of the target points P2 to P6 shown in FIG. 8, the watercraft operating controller 30 determines that the present phase is the leftward turning in a similar manner to when the next target point is the target point P1. Therefore, as shown in FIG. 13, when the next target point is any of the target points P2 to P6, the watercraft operating controller 30 imposes a limitation on the rightward target yaw rate without imposing a limitation on the leftward target yaw rate.

Thus, when the target course has a counterclockwise spiral shape, the watercraft operating controller 30 imposes a limitation on the rightward target yaw rate without imposing a limitation on the leftward target yaw rate. When the target course has a clockwise spiral shape, the watercraft operating controller 30 imposes a limitation on the leftward target yaw rate without imposing a limitation on the rightward target yaw rate, although the illustration thereof is herein omitted. It should be noted that the values shown in FIGS. 12 and 13 are exemplary only, values of limitations imposed on the target yaw rate are not limited to those shown in FIGS. 12 and 13.

In the system according to the preferred embodiments explained above, when the rightward turning is being made by the watercraft 100, a limitation is imposed on the leftward target yaw rate. Contrarily, when the leftward turning is being made by the watercraft 100, a limitation is imposed on the rightward target yaw rate. Because of this, hunting in the direction of the watercraft 100 is inhibited. Accordingly, the watercraft 100 is accurately moved along the target course.

Preferred embodiments of the present invention have been explained above. However, the present invention is not limited to the preferred embodiments described above, and a variety of changes can be made without departing from the gist of the present invention.

Each marine propulsion device is not limited to the outboard motor, and alternatively, another type of device may be used. For example, each marine propulsion device may be an inboard engine outboard drive or a jet propulsion device. The target course is not limited to have the zigzag shape or the spiral shape and may have another shape. For example, the target course may have a shape including a plurality of turns repeating continuously or intermittently at short intervals. Alternatively, the target course may have a shape arbitrarily determined as shown in FIG. 4.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for controlling a watercraft, the system comprising:
   a marine propulsion device rotatable about a steering shaft;
   a steering actuator to rotate the marine propulsion device about the steering shaft;
   a position sensor to detect a present position of the watercraft;
   a direction sensor to detect a present direction of the watercraft; and
   a controller configured or programmed to:
      control the marine propulsion device and the steering actuator such that the watercraft moves along a target course;
      determine a target direction of the watercraft based on the target course;
      calculate a directional difference between the target direction and the present direction;
      determine a target yaw rate based on the directional difference with reference to target yaw rate data defining a relationship between the directional difference and the target yaw rate;

change a rudder angle of the marine propulsion device by controlling the steering actuator based on the target yaw rate;

determine which of rightward turning and leftward turning is being made by the watercraft;

impose a limitation on a leftward target yaw rate when the rightward turning is being made by the watercraft; and impose a limitation on a rightward target yaw rate when the leftward turning is being made by the watercraft.

2. The system according to claim 1, wherein the controller is further configured or programmed to:

determine a plurality of target points located on the target course;

determine a plurality of sections each set between adjacent two of the plurality of target points;

determine which of a post-right turning section and a post-left turning section is being followed by the watercraft in the plurality of sections;

impose a limitation on the leftward target yaw rate when the post-rightward turning section is being followed by the watercraft; and impose a limitation on the rightward target yaw rate when the post-leftward turning section is being followed by the watercraft.

3. The system according to claim 1, wherein the target course has a zigzag shape.

4. The system according to claim 1, wherein the target course has a spiral shape.

5. A method of controlling a watercraft including a marine propulsion device, the method comprising:

determining a target course of the watercraft;

detecting a present position of the watercraft;

detecting a present direction of the watercraft;

determining a target direction of the watercraft based on the target course;

calculating a directional difference between the target direction and the present direction;

determining a target yaw rate based on the directional difference with reference to target yaw rate data defining a relationship between the directional difference and the target yaw rate;

changing a rudder angle of the marine propulsion device based on the target yaw rate;

determining which of rightward turning and leftward turning is being made by the watercraft;

imposing a limitation on a leftward target yaw rate when the rightward turning is being made by the watercraft; and imposing a limitation on a rightward target yaw rate when the leftward turning is being made by the watercraft.

6. The method according to claim 5, further comprising:

determining a plurality of target points located on the target course;

determining a plurality of sections each set between adjacent two of the plurality of target points;

determining which of a post-right turning section and a post-left turning section is being followed by the watercraft in the plurality of sections;

imposing a limitation on the leftward target yaw rate when the post-rightward turning section is being followed by the watercraft; and imposing a limitation on the rightward target yaw rate when the post-leftward turning section is being followed by the watercraft.

7. The method according to claim 5, wherein the target course has a zigzag shape.

8. The method according to claim 5, wherein the target course has a spiral shape.

* * * * *